United States Patent
Sumi et al.

(10) Patent No.: US 8,611,972 B2
(45) Date of Patent: Dec. 17, 2013

(54) MOBILE WIRELESS APPARATUS

(75) Inventors: Hirotake Sumi, Kawasaki (JP); Hiroshi Watanabe, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 333 days.

(21) Appl. No.: 12/838,619

(22) Filed: Jul. 19, 2010

(65) Prior Publication Data
US 2011/0244931 A1  Oct. 6, 2011

(30) Foreign Application Priority Data

Mar. 31, 2010  (JP) .................................. P2010-084340

(51) Int. Cl.
*H04W 88/02* (2009.01)
(52) U.S. Cl.
USPC ............... 455/575.4; 455/575.1; 455/90.3; 455/347; 343/702; 343/906
(58) Field of Classification Search
USPC .............. 455/573, 575.1, 575.4, 575.3, 351, 455/90.3, 349, 566, 575; 343/702, 901, 343/906, 900; 353/122
See application file for complete search history.

(56) References Cited

U.S. PATENT DOCUMENTS

| | | | | |
|---|---|---|---|---|
| 7,447,530 | B2 * | 11/2008 | Iwai et al. | 455/575.7 |
| 2007/0243913 | A1 * | 10/2007 | Collins | 455/575.4 |
| 2009/0033563 | A1 * | 2/2009 | Kanasaki et al. | 343/702 |
| 2010/0203930 | A1 * | 8/2010 | Hikino | 455/575.4 |

FOREIGN PATENT DOCUMENTS

JP  2008-005207 A  1/2008

OTHER PUBLICATIONS

Electrical conductivity Feb. 7, 2012, wikipedia, p. 1.*
Electrical conductor, Feb. 4, 2012, wikipedia, p. 1-2.*

* cited by examiner

*Primary Examiner* — Mahendra Patel
(74) *Attorney, Agent, or Firm* — Maschoff Brennan

(57) ABSTRACT

According to one embodiment, a mobile wireless apparatus includes: a first housing; and a second housing configured to be slidably connected to the first housing. The first housing includes: a conductor section; and a conducting member configured comprise a conductive material and to be connected to the conductor section. The second housing includes: a ground circuit; a power feed circuit; a slide member configured to comprise a conductive material, to be connected to the ground circuit, and to be slidably engaged with the first housing; and an unbalanced antenna configured to be connected to the power feed circuit. The conducting member is configured to make contact with the slide member when the first housing is opened with respect to the second housing.

7 Claims, 3 Drawing Sheets

MOBILE WIRELESS APPARATUS

CROSS REFERENCE TO RELATED APPLICATION(S)

The present disclosure relates to the subject matters contained in Japanese Patent Application No. 2010-084340 filed on Mar. 31, 2010, which are incorporated herein by reference in its entirety.

FIELD

Embodiments, described herein relate generally to a mobile wireless apparatus, such as a mobile wireless apparatus with a so-called slide type housing structure.

BACKGROUND

In a recent mobile wireless apparatus such as a mobile phone, since it is necessary to meet requirements for miniaturization as well as multifunctionality and high performance, a structure in which two housings are openably connected to each other is mainly employed. For connection between the two housings, a scheme such as a folding type, a folding type (may be referred to as a double swivel type) including a two-axis hinge, and a slide type has been extensively used. Among them, the slide type is characterized in that an opening and closing operation is simple and a display screen is easily visible although the two housings are closed.

Any one of the two housings slidably engaged with each other has an antenna therein. A part of each housing may be made of a conductive material such as a metal. Each housing has a conductor section such as a ground pattern of a circuit board. Since a positional relationship between the antenna and these housings or the conductor section of the circuit varies depending on the opening and closing of the slide structure, which may affect antenna characteristics.

JP-A-2008-5207 discloses a technology that aims at maintaining good antenna characteristics in the state in which two housings of a slide type mobile wireless apparatus (a slide type mobile terminal) are opened or closed with respect to each other.

The slide type mobile terminal disclosed in JP-A-2008-5207 includes a first housing provided with a conductor member, a second housing provided with an embedded antenna and a power feed circuit, a slide means that slidably connects the first housing to the second housing, and a conductive coupling member which is connected to the conductor member so as to simultaneously slide together with the conductor member and is connected to the embedded antenna and the power feed circuit in the open state of the slide structure.

In the slide type mobile terminal disclosed in JP-A-2008-5207, the embedded antenna and the conductor member of the first housing are connected in parallel to the power feed circuit of the second housing in the open state of the slide structure. As a result, a ground circuit (a ground member included in the second housing) for the power feed circuit and the conductor member of the first housing form a dipole antenna, and are excited together with the embedded antenna (a modified example in which power supplied to the embedded antenna is interrupted in the open state is also disclosed therein). Meanwhile, in a closed state of the slide structure, only the embedded antenna is excited. In addition, JP-A-2008-5207 also discloses a configuration in which an opening and closing detector and two matching circuits are provided, and the two matching circuits are switched to meet antenna matching conditions in the open state and the closed state.

According to the slide type mobile terminal disclosed in JP-A-2008-5207, in the open state of the slide structure, since the conductor member of the first housing is connected to the power feed circuit of the second housing through the conductive coupling member, the dipole antenna formed over the first housing and the second housing is excited. Meanwhile, in the closed state of the slide structure, only the embedded antenna is excited.

The slide type mobile terminal disclosed in JP-A-2008-5207 requires switching of the matching circuits or switching of embedded antenna connection according to a change of the circuit configuration caused by the opening and closing of the slide structure, separately from switching of the connection through the conductive coupling member. That is, the circuit configuration may be complicated and the housings may not be fabricated at a small size.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION

Figure 1:
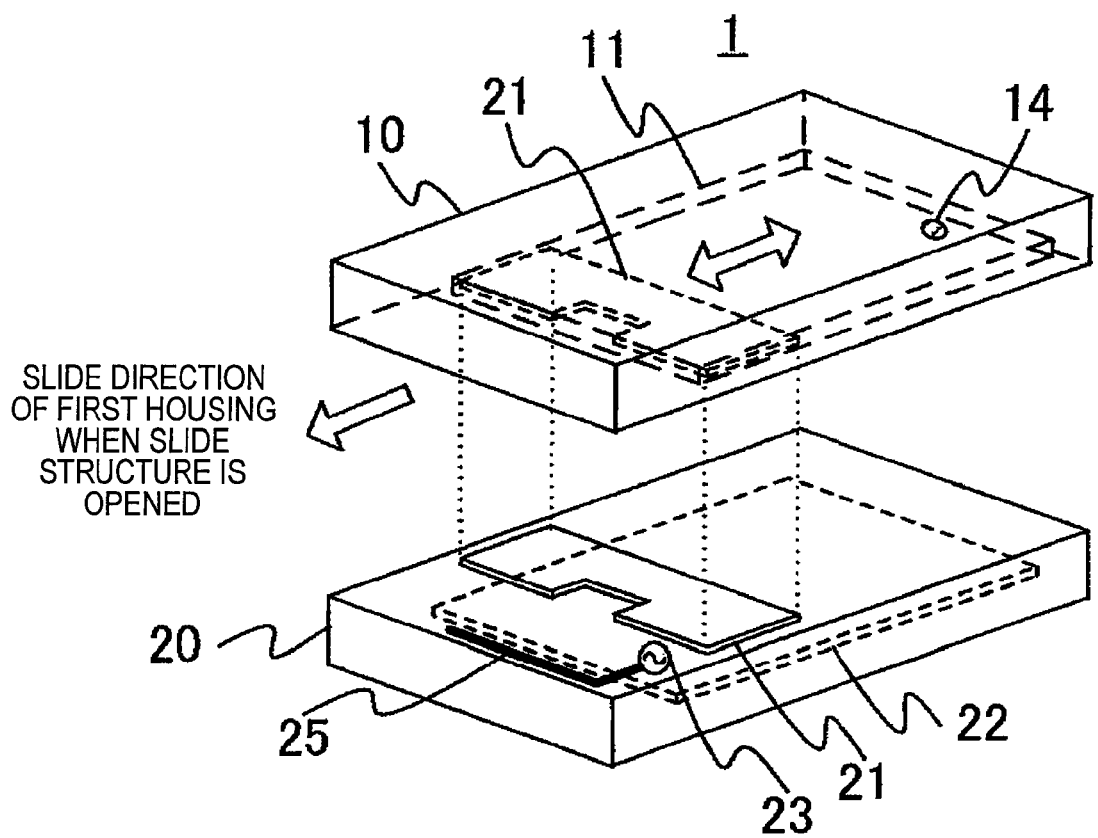
FIG. 1 is a perspective view showing main elements of a mobile wireless apparatus according to an embodiment in a closed state of a slide structure.

In general, according to one embodiment, a mobile wireless apparatus includes: a first housing; and a second housing configured to be slidably connected to the first housing. The first housing includes: a conductor section; and a conducting member configured comprise a conductive material and to be connected to the conductor section. The second housing includes: a ground circuit; a power feed circuit; a slide member configured to comprise a conductive material, to be connected to the ground circuit, and to be slidably engaged with the first housing; and an unbalanced antenna configured to be connected to the power feed circuit. The conducting member is configured to make contact with the slide member when the first housing is opened with respect to the second housing.

Hereinafter, an embodiment of the present invention will be described in detail with reference to FIGS. 1 to 5. In addition, in the following description, when the upper/lower and the right/left represent a vertical (perpendicular) direction and a horizontal direction, respectively, the upper/lower and the right/left in the plane indicated by the accompanying drawings represent the vertical (perpendicular) direction and the horizontal direction unless otherwise noted. Moreover, the same reference numerals in the accompanying drawings are used to designate the same elements.

FIG. 1 is a perspective view showing main elements of a mobile wireless apparatus 1 according to the embodiment.

The mobile wireless apparatus 1 has a structure in which a first housing 10 and a second housing 20 overlap each other and are slidably connected to each other (for the purpose of convenience for an explanation, in FIG. 1, the first housing 10 is spaced apart from the second housing 20 at a predetermined interval, and a positional relationship between the first housing 10 and the second housing 20 in the horizontal direction of FIG. 1 corresponds to the closed state of the slide structure). The first housing 10 includes a conductor section, wherein at least a part of the conductor section is made of metal and the like.

A slide member 21 is provided at a side of the second housing 20 facing the first housing 10. The slide member 21 includes a conductive material such as a metal. An engagement section 11 is provided at a side of the first housing 10 facing the second housing 20. The slide member 21 engages with the engagement section 11 in a state in which the mobile wireless apparatus 1 is assembled by connecting the first housing 10 to the second housing 20. In the upper part (the first housing 10) of FIG. 1, the slide member 21 engaged with the engagement section 11 is indicated by a broken line.

The slide member 21 is able to slide with respect to the engagement section 11 as indicated by the bi-directional block arrow. A slide structure may have a spring member (not shown) to facilitate sliding.

The slide member 21 fixedly provided in the second housing 20 is slidably engaged with the engagement section 11 of the first housing 10, so that the first housing 10 is slidably connected to the second housing 20. The block arrow in the left direction of FIG. 1 indicates the slide direction of the first housing 10 with respect to the second housing 20 when the slide structure is opened, that is, when the mobile wireless apparatus 1 becomes from the closed state to the open state.

A conducting member 14 is provided facing downward at a place in the conductor section of the first housing 10. For example, the conducting member 14 includes a conductive material such as a metal or a conductive gasket. In addition, a part of the conductor section of the first housing 10 is processed to protrude downward, so that a part corresponding to the conducting member 14 may also be formed.

A substrate 22 (indicated by a broken line) including a ground circuit is provided in the second housing 20. For example, the substrate 22 may be connected to a substrate (not shown), which is provided in the first housing 10, through a flexible substrate (not shown) installed by cutting a left long side of the slide member 21. In addition, the shape of the slide member 21 is not limited to the above example.

In a feeding point 23 provided in the substrate 22, an unbalanced antenna 25 is connected to a wireless circuit (not shown) provided in the substrate 22. The slide member 21 is connected to the ground circuit of the substrate 22. When the antenna 25 is excited by the wireless circuit, an unbalanced current induced in the ground circuit of the substrate 22 serves as a radiation source of electromagnetic waves. In addition, when at least a part of the second housing 20 is formed or processed using a conductive material, the slide member 21 may also be connected to the conductive part of the second housing 20, instead of the ground circuit of the substrate 22 (or in addition to the ground circuit of the substrate 22).

Figure 2:
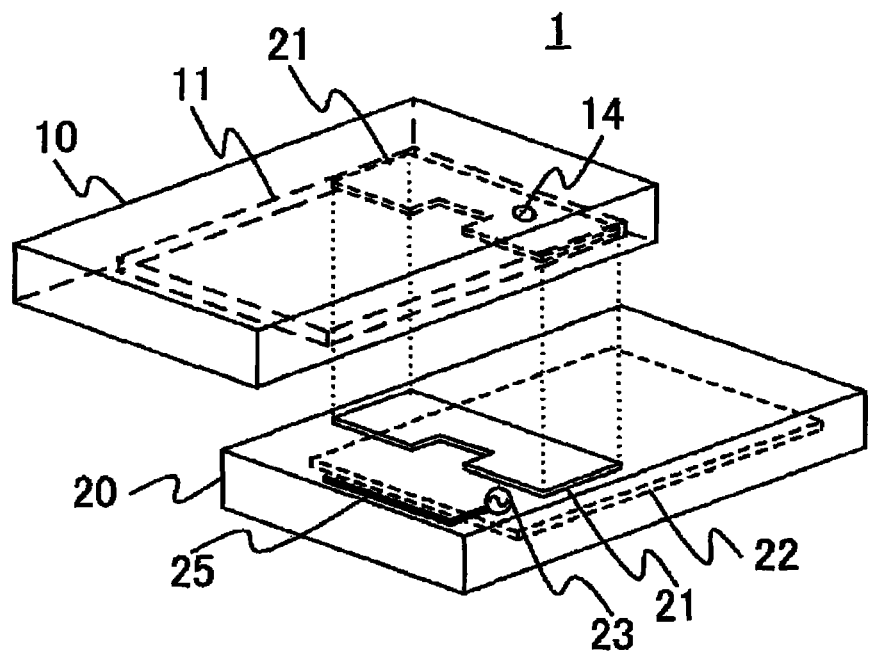
FIG. 2 is a perspective view showing the main elements of the mobile wireless apparatus according to the embodiment in an open state of the slide structure.

FIG. 2 is a perspective view showing the main elements of the mobile wireless apparatus 1 similarly to FIG. 1, and the positional relationship between the first housing 10 and the second housing 20 in the horizontal direction of FIG. 2 corresponds to the open state of the slide structure. Since the reference numerals of each element shown in FIG. 2 are the same as those of FIG. 1, detailed description thereof will be omitted in order to avoid redundancy. However, since the slide structure is in the open state, the slide member 21 is located at the right side of the engagement section 11, differently from the closed state of FIG. 1.

As a result, the conducting member 14 makes contact with the slide member 21. As described above, the conducting member 14 includes the conductive material and is included in the conductor section of the first housing 10. The slide member 21 includes the conductive material and is connected to the ground circuit of the substrate 22. Accordingly, in the open state of the slide structure as shown in FIG. 2, the conductor section of the first housing 10 is electrically connected to the ground circuit of the substrate 22.

Consequently, since the unbalanced current induced in the ground circuit of the substrate 22 is distributed to the conductor section of the first housing 10 when the antenna 25 is excited by the wireless circuit, radiation efficiency (or gain) when the distribution range of the unbalanced current is regarded as an antenna may be improved. Since the connection conditions of the antenna 25 does not vary depending on the opening and closing of the slide structure, switching of a matching circuit is not required.

Figure 3:
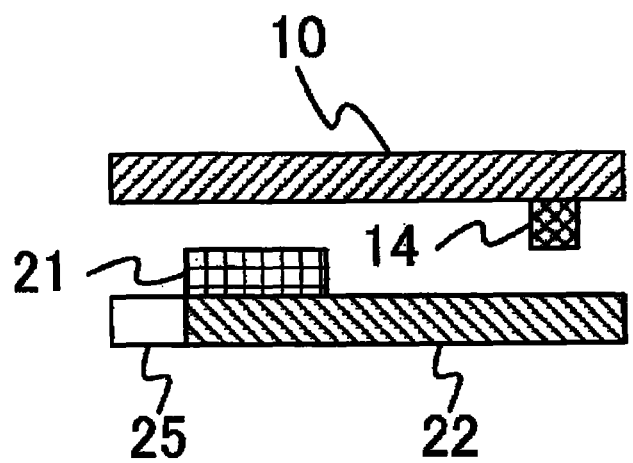
FIG. 3 is a side view schematically showing the main elements of the mobile wireless apparatus according to the embodiment in the closed state.
Figure 4:
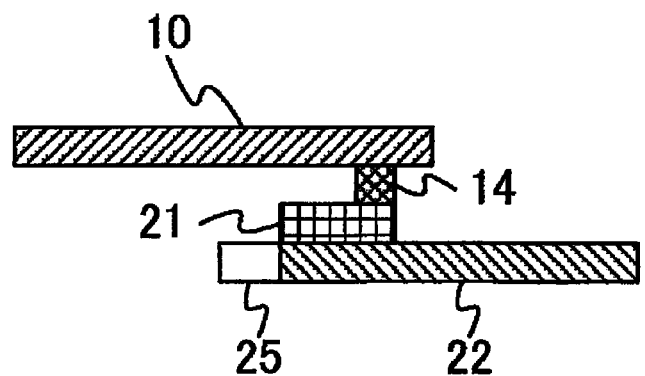
FIG. 4 is a side view schematically showing the main elements of the mobile wireless apparatus according to the embodiment in the open state.

FIG. 3 is a side view schematically showing the positional relationship between the main elements of the mobile wireless apparatus 1 shown in FIG. 1 when viewed in the lateral direction (the direction parallel to a short side of the substrate 22). FIG. 4 is a side view schematically showing the positional relationship between the main elements of the mobile wireless apparatus 1 shown in FIG. 2 when viewed in the same lateral direction.

As shown in FIG. 3, in the closed state of the slide structure, the conducting member 14 is separated from the slide member 21. As a result, the conductor section of the first housing 10 is not electrically connected to the ground circuit of the substrate 22. Referring to FIG. 3, since the antenna 25 is located below the left side of the first housing 10, the antenna 25 is not completely covered by the first housing 10 when viewed in the downwardly inclined direction on the left side of the housing 10. Consequently, even if the conductor section of the first housing 10 is not electrically connected to the ground circuit of the substrate 22, the reduction of the radiation efficiency is suppressed to a certain degree.

As shown in FIG. 4, in the open state of the slide structure, the conducting member 14 makes contact with the slide member 21. As a result, the conductor section of the first housing 10 is electrically connected to the ground circuit of the substrate 22 as described above. Referring to FIG. 4, since the antenna 25 is located below and in the vicinity of the center of the first housing 10, the antenna 25 is significantly covered by the first housing 10 when viewed from the top of the housing 10. However, the conductor section of the first housing 10 is electrically connected to the ground circuit of the substrate 22, thereby the reduction of the radiation efficiency can be compensated.

As described above, in the open state of the slide structure as shown in FIG. 2 or 4, the conductor section of the first housing 10 is electrically connected to the ground circuit of the substrate 22 through the conducting member 14 and the slide member 21. A reactance element is inserted into a part of the conduction circuit, so that it is possible to adjust the frequency that compensates for the reduction of the radiation efficiency.

Figure 5:
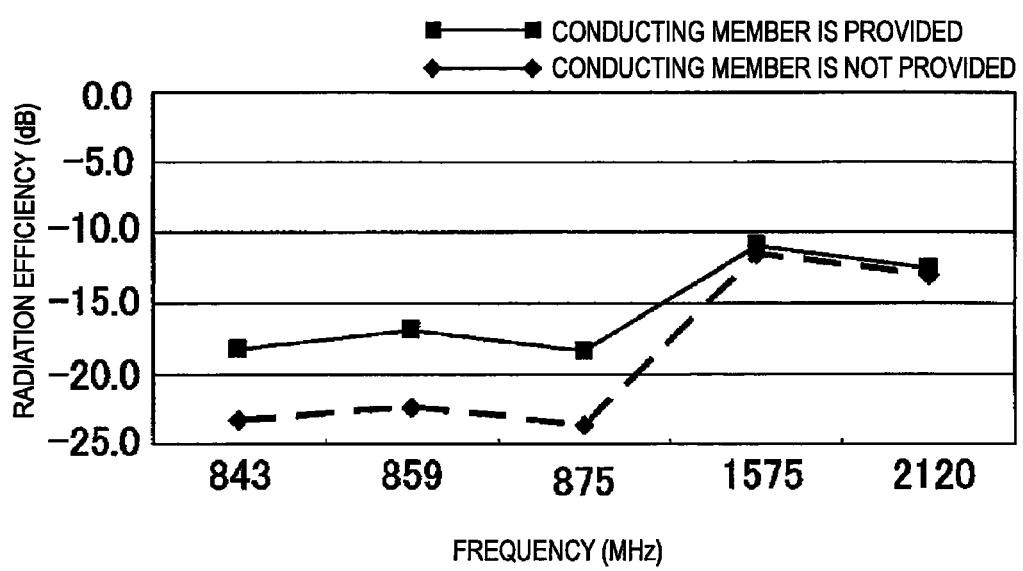
FIG. 5 is a graph showing data of an experimental example in which antenna radiation efficiency of the mobile wireless apparatus according to the embodiment was evaluated.

FIG. 5 is a graph showing data of an experimental example in which the radiation efficiency of the antenna 25 in the mobile wireless apparatus 1 was evaluated. In FIG. 5, a horizontal axis denotes a frequency (MHz, and numerical values are not continuously indicated), and a vertical axis denotes radiation efficiency (dB). The graph indicated by a solid line represents data of a configuration example (including the conducting member 14) of the mobile wireless apparatus 1. The graph indicated by a broken line represents data of a configuration example (excluding only the conducting member 14) of the mobile wireless apparatus 1. As shown in FIG. 5, by the providing of the conducting member 14, it can be understood that the radiation efficiency in a frequency band of about 800 MHz for a mobile phone was improved by about 6 dB to about 7 dB.

In the previous embodiment as described above, the scheme, shape, configuration and connection of the mobile wireless apparatus and the antenna, the shapes and arrangement of elements other than the antenna, and the like are only for an example. For example, various modifications can be made without departing from the scope of the present invention.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A mobile wireless apparatus comprising:
a first housing; and
a second housing configured to be slidably connected to the first housing,
wherein the first housing includes:
a conductor section; and
a conducting member configured comprise a conductive material and to be connected to the conductor section,
wherein the second housing includes:
a ground circuit;
a power feed circuit;
a slide member configured to comprise a conductive material, to be connected to the ground circuit, and to be slidably engaged with the first housing; and
an unbalanced antenna configured to be connected to the power feed circuit,
wherein the conducting member is configured to make contact with the slide member when the first housing is opened with respect to the second housing, and configured to be separated from the slide member when the first housing is closed with respect to the second housing so that the conductor section of the first housing is not electrically connected to the ground circuit of the second housing, and
wherein the conductor section is configured to be electrically connected to the ground circuit through the slide member and the conducting member when the first housing is opened with respect to the second housing.

2. The apparatus of claim 1, wherein the antenna is provided at an overlapping position with respect to the first housing and configured to be covered by the first housing when the first housing is opened with respect to the second housing.

3. The apparatus of claim 1, wherein the conducting member is configured to allow the conductor section to be electrically connected to the slide member through a reactance element.

4. A mobile wireless apparatus comprising:
a first housing; and
a second housing configured to comprise a conductive material and to be slidably connected to the first housing,
wherein the first housing includes:
a conductor section; and
a conducting member configured to comprise a conductive material and to be connected to the conductor section,
wherein the second housing includes:
a power feed circuit;
a slide member configured to comprise a conductive material and to be slidably engaged with the first housing; and
an unbalanced antenna configured to be connected to the power feed circuit,
wherein the conducting member is configured to make contact with the slide member when the first housing is opened with respect to the second housing, and configured to be separated from the slide member when the first housing is closed with respect to the second housing so that the conductor section of the first housing is not electrically connected to the second housing, and
wherein the antenna is provided at an overlapping position with respect to the first housing and configured to be covered by the first housing when the first housing is opened with respect to the second housing.

5. The apparatus of claim 4, wherein the conductor section is configured to be electrically connected to the second housing through the slide member and the conducting member when the first housing is opened with respect to the second housing.

6. The apparatus of claim 4, wherein the conducting member is configured to allow the conductor section to be electrically connected to the slide member through a reactance element.

7. The apparatus of claim 5, wherein the conducting member is configured to allow the conductor section to be electrically connected to the slide member through a reactance element.

* * * * *